United States Patent [19]

Hubbard et al.

[11] 4,109,368

[45] Aug. 29, 1978

[54] METHOD OF ASSEMBLING A SUB-ASSEMBLY OF A DIAPHRAGM SPRING FRICTION CLUTCH

[75] Inventors: William Ernest Hubbard; Robert Hyde; Peter Frederick Crawford, all of Leamington Spa, England

[73] Assignee: Automotive Products Limited, Leamington Spa, England

[21] Appl. No.: 735,082

[22] Filed: Oct. 22, 1976

[30] Foreign Application Priority Data

Jul. 14, 1976 [GB] United Kingdom ............... 29199/76

[51] Int. Cl.² ............................................. B23P 11/02
[52] U.S. Cl. ....................................... 29/446; 29/513;
113/116 CC; 192/89 B
[58] Field of Search .................................. 29/513, 446;
113/116 CC; 192/70.27, 89 B

[56] References Cited

U.S. PATENT DOCUMENTS

| | | | |
|---|---|---|---|
| 2,169,787 | 8/1939 | Becker | 192/70.27 X |
| 2,857,665 | 10/1958 | Cohen | 29/513 |
| 3,865,221 | 12/1974 | Coty | 29/513 X |
| 3,939,951 | 2/1976 | Sink et al. | 192/89 B |

*Primary Examiner*—Charlie T. Moon
*Attorney, Agent, or Firm*—Kemon & Estabrook

[57] ABSTRACT

The invention relates to diaphragm spring friction clutches in which the diaphragm spring is supported on a cover by tabs which extend through slots between the fingers of the diaphragm spring and are bent radially outwards on assembly over an adjacent arc of a fulcrum ring which is on the opposite side of the spring to the cover. To achieve firm clenching of the diaphragm spring and the fulcrum ring by the tabs, during the bending operation each tab is supported against radially inward movement where it extends through the spring slot while the fulcrum ring is supported against radially outward movement over those arcs which are gripped by the tabs.

7 Claims, 7 Drawing Figures

METHOD OF ASSEMBLING A SUB-ASSEMBLY OF A DIAPHRAGM SPRING FRICTION CLUTCH

The invention relates to diaphragm spring friction clutches of the kind which comprises a cover which is adapted to be connected to a driving member such as an engine flywheel, a diaphragm spring having a plurality of radially inwardly directed fingers and a pressure plate which is driven for rotation with the driving member and is adapted to grip a driven plate under a load applied by the diaphragm spring near its radially outer periphery, the diaphragm spring being supported by the cover adjacent the radially outer ends of the diaphragm spring fingers and the clutch being released by axial pressure towards the driving member on the inner ends of the diaphragm spring fingers.

Particularly, the invention relates to a method of assembling a sub-assembly which includes the diaphragm spring and the cover of a diaphragm spring clutch of the kind referred to, and also to apparatus for assembling such a sub-assembly.

In one known form of diaphragm spring friction clutch of the kind referred to, the diaphragm spring is supported and located on the cover by tabs which extend from the cover through slots between adjacent fingers of the spring and which, on assembly, were bent radially outwards to support the diaphragm spring through a fulcrum ring on the opposite side of the diaphragm spring to the cover. However, it has been found difficult to bend the tabs to locate the diaphragm spring firmly and accurately and to achieve proper location of the fulcrum ring. Without proper location of the diaphragm spring and the fulcrum ring the pressure plate will not engage evenly and will judder. Furthermore, if the spring is not firmly gripped between the cover and the fulcrum ring, the pressure plate will not be moved away from the driving member sufficiently to fully disengage the driven plate since the load which the diaphragm spring exerts on the cover changes from a value equal to the clamping load on the driven plate, which is reacted in one direction, to a value equal to the release load on the radially inner ends of the diaphragm spring fingers, which is reacted in the opposite direction. If the spring is not firmly gripped, the condition will be rapidly worsened by fretting between the spring and the other components, particularly in a motor vehicle where the drive line is subject to torsional vibrations.

It is an object of the invention to provide firm and accurate location of the diaphragm spring on the cover in a diaphragm spring clutch of the kind referred to which incorporates tabs which support the diaphragm spring through a fulcrum ring on the opposite side of the diaphragm spring to the cover.

According to one aspect of the invention there is provided a method of assembling a sub-assembly of a diaphragm spring friction clutch, the components of the sub-assembly including a cover, a diaphragm spring having a plurality of radially inwardly directed fingers and which is to be supported by the cover adjacent the radially outer ends of the fingers, a flucrum ring to be located on the opposite side of the diaphragm spring to the cover, and a plurality of tabs which, before the assembly, extend from the cover in a direction substantially parallel to the axis of the spring through slots between adjacent fingers of the spring and through the fulcrum ring, the method including the steps of flattening the diaphragm spring and bending each tab radially outwards by a forming tool over the adjacent arc of the fulcrum ring to support the diaphragm spring on the cover whilst simultaneously supporting, against radially inward movement, the tab where it extends through the associated slot in the diaphragm spring and, against radially outward movement, said arc of the fulcrum ring.

Conveniently, the forming tool is urged axially with respect to the diaphragm spring, preferably all the tabs being bent simultaneously by a single forming tool which may have a spring-loaded connection to an annular punch which flattens the diaphragm spring before the tabs are bent into shape.

The tabs are conveniently supported by abutments which are fixed relative to each other, in which case they may be attached to or form part of the forming tool or may be attached to or form part of a support plate for the cover.

The fulcrum ring may be supported against radially outward movement by abutment surfaces provided on a support ring which includes recesses between adjacent pairs of abutment surfaces, the support ring being withdrawn past the tabs after the tabs have been bent by turning the support ring relative to the cover and bringing the recesses into register with the tabs. Alternatively, the abutment surfaces may be provided on blocks which are moved into position by cam means operatively connected to the forming tool.

According to a further aspect of the invention there is provided apparatus for assembling a sub-assembly of a diaphragm spring friction clutch, the components of the sub-assembly including a cover, a diaphragm spring having a plurality of radially inwardly directed fingers and which is to be supported by the cover adjacent the radially outer ends of the fingers, a fulcrum ring to be located on the opposite side of the diaphragm spring to the cover, and a plurality of tabs which, before the assembly, extend from the cover in a direction substantially parallel to the axis of the spring through slots between adjacent fingers of the spring and through the fulcrum ring, the apparatus comprising means for flattening the diaphragm spring, a forming tool for bending each tab radially outwards over the adjacent arc of the fulcrum ring to support the diaphragm spring on the cover, abutments for supporting, during bending, each tab against radially inward movement where it extends through the associated slot in the diaphragm spring and abutment surfaces for simultaneously supporting said arc of the fulcrum ring against radially outward movement.

Conveniently, the forming tool is movable axially with respect to the diaphragm spring to bend the tab and preferably a single forming tool is provided for bending all the tabs simultaneously, in which case an annular punch, having a spring-loaded connection to the forming tool, may be provided for flattening the diaphragm spring before the tabs are bent into shape.

The abutments are conveniently fixed relative to each other, in which case they may be attached to, or form part of, the forming tool or may be attached to, or form part of, a support plate for the cover.

The abutment surfaces which support the fulcrum ring may be on a support ring which includes recesses between adjacent pairs of abutment surfaces to allow the support ring to be withdrawn past the tabs after the tabs have been bent by turning the support ring relative to the cover and bringing the recesses into register with the tabs, in which case the support ring may be carried by the annular punch. Alternatively, the abutment surfaces may be provided on blocks which are moved into position by cam means connected to the forming tool.

The fulcrum ring cannot conveniently be supported against radially outward movement over those arcs of the ring which are gripped by the tabs whilst the tabs are bent into their final form, but it has been found that, if the tabs are bent through approximately 55° whilst simultaneously supporting the fulcrum ring against radially outward movement, the tabs can be bent into their final form without further support against radially outward movement for the fulcrum ring.

Some embodiments of the invention will now be described by way of example and with reference to the accompanying drawings, of which:

Figure 1:
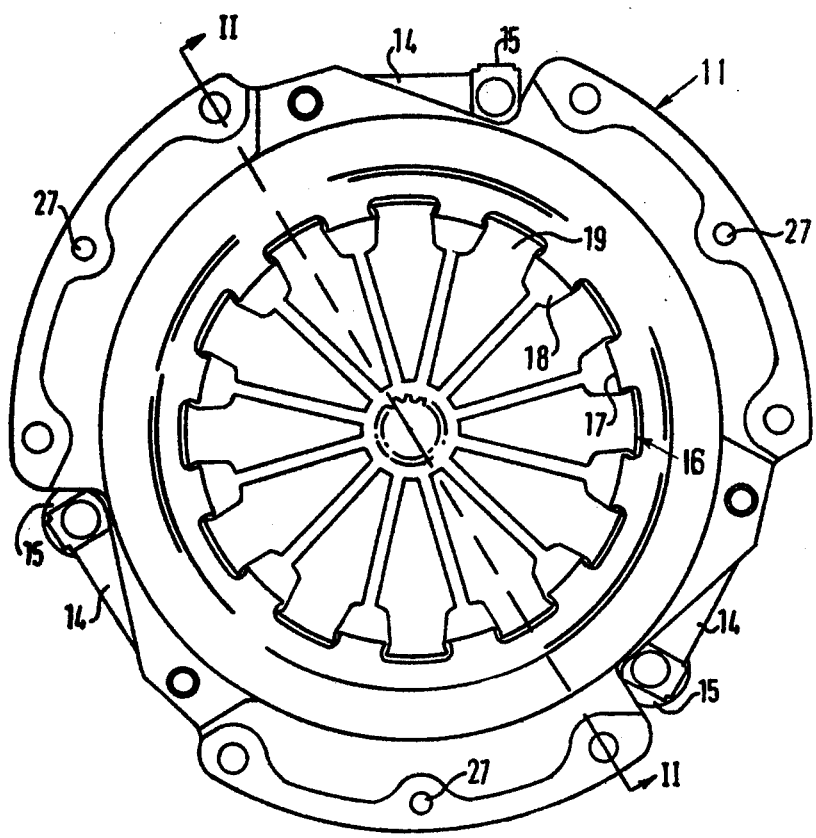
FIG. 1 is an elevation of a diaphragm spring clutch which has been assembled using the method and apparatus according to the invention.
Figure 2:
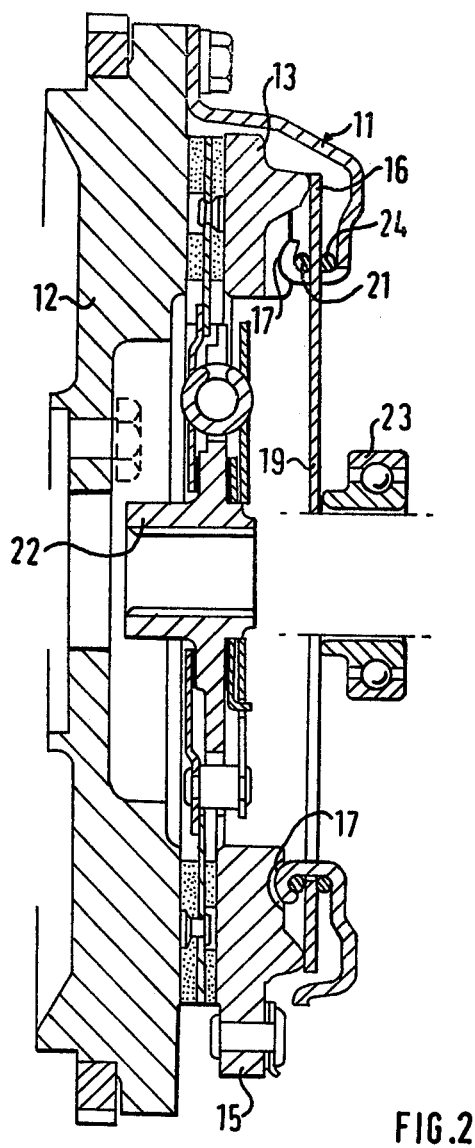
FIG. 2 is a cross-section on the line II — II of FIG. 1.

Referring to FIGS. 1 and 2, the diaphragm spring friction clutch which has been assembled according to the invention comprises a pressed steel cover 11 adapted to be bolted to a driving member in the form of an engine flywheel 12. A pressure plate 13 is driven for rotation with the flywheel 12 by three tangential straps 14 which are riveted to lugs 15 on the pressure plate 13 and to the cover 11. A diaphragm spring 16 is supported and located on the cover 11 by tabs 17 which are integral with the cover 11 and which extend from the cover 11 through slots 18 between adjacent fingers 19 of the spring 16. During assembly of the clutch the tabs 17 were bent radially outwards to support a fulcrum ring 21 on the opposite side to the diaphragm spring 16 to the cover 11, a second fulcrum ring 24 being interposed between the diaphragm spring 16 and the cover 11. The diaphragm spring 16 applies, near its radially outer periphery, a load to the pressure plate 13 to grip a driven plate 22 against the flywheel 12. The driven plate 22 is released by a load applied to the radially inner ends of the diaphragm spring fingers 19 in the direction towards the flywheel 12 by a release bearing 23.

Figure 3:
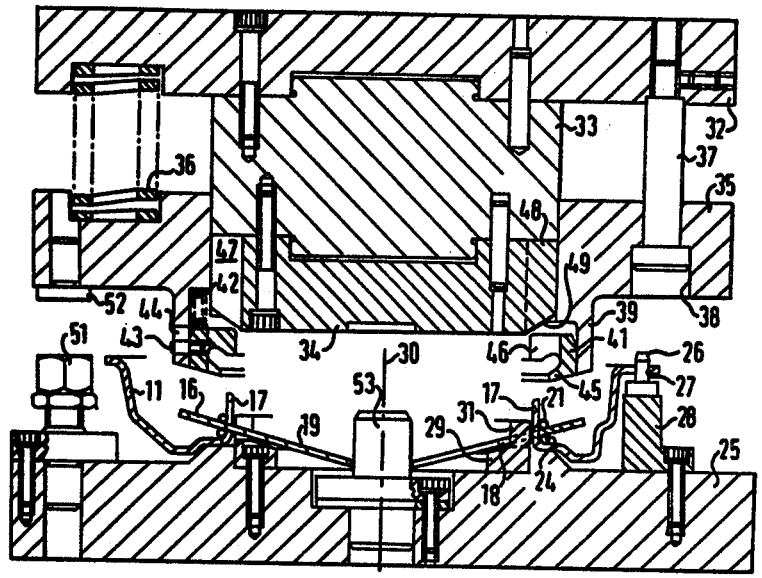
FIG. 3 is a cross-sectional view of one form of apparatus for assembling a sub-assembly of a diaphragm spring clutch according to the invention, certain components of the clutch shown in FIGS. 1 and 2 being shown in position prior to assembly.
Figure 4:
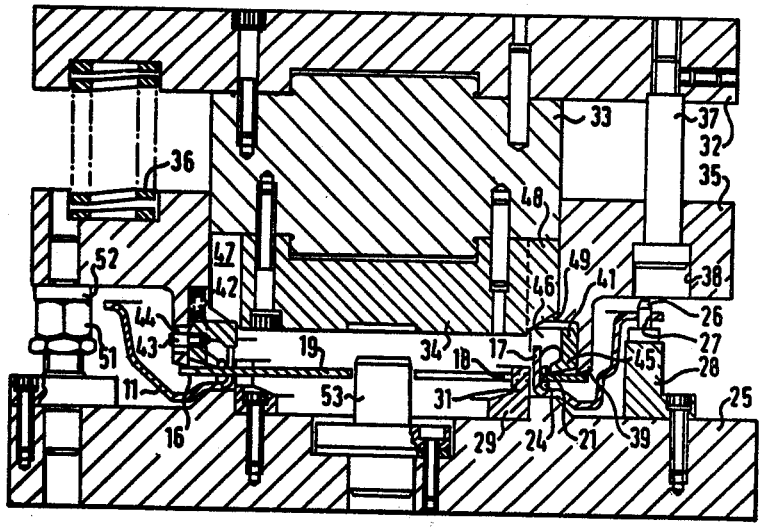
FIG. 4 is a view similar to FIG. 3 showing the same apparatus having moved through one stage of the assembly operation.
Figure 5:
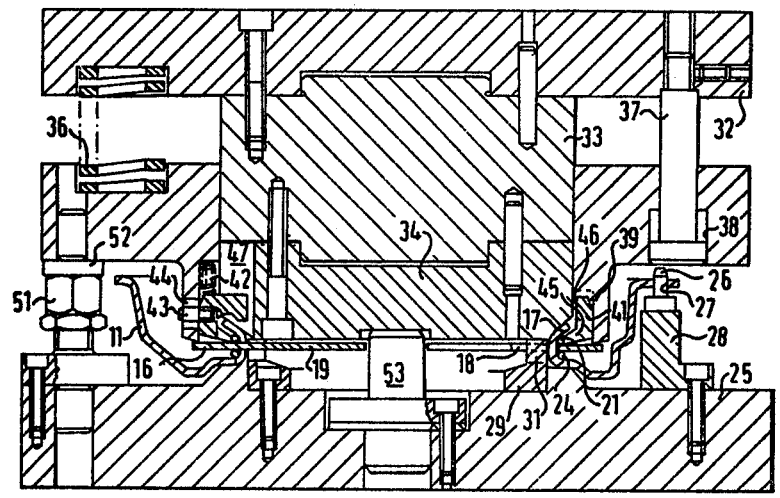
FIG. 5 is another view similar to FIG. 3 showing the same apparatus having moved through a second stage of the assembly operation.

Referring to FIGS. 3 to 5, the cover 11, the diaphragm spring 16 and the fulcrum rings 21, 24 are placed on the base plate 25 of one form of apparatus for assembling those clutch components into a sub-assembly of the diaphragm spring clutch shown in FIGS. 1 and 2. The cover 11 is shown in the form in which it is received after pressing, with the tabs 17 extending from it in a direction which is substantially parallel to the axis 30 of the diaphragm spring 16 when the spring is in position with the tabs 17 extending through the slots 18.

The cover 11 is located by pins 26 in three dowel holes 27, the pins 26 being supported on the base plate 25 by pillars 28. A solid support ring 29 carried by the base plate 25 has castellations 31 which extend through the slots 18 in the diaphragm spring 16 to centralise the diaphragm spring and locate it in its correct position circumferentially prior to assembly.

The base plate 25 is adapted to be attached to the bottom bolster of a vertical press. Another plate 32 is adapted to be attached to the top bolster of the press and carries, through a support block 33, a forming tool 34.

The top plate 32 also carries an annular punch 35 which is spring loaded in the downward direction by six circumferentially spaced springs 36. Three circumferentially spaced headed pins 37 screwed into the top plate 32 guide the annular punch through corresponding stepped bores 38 and restrain the punch 35 against the pre-load of the springs 36. The lower face of the annular punch 35 has an annular lip 39, the recess formed by the lip 39 providing a sliding location for a support ring 41. The support ring 41 is spring loaded in a downward direction by six circumferentially spaced coil springs 42, movement being limited by three circumferentially spaced pegs 43 which screw into the ring 41 and slide in corresponding vertical slots 44 in the annular lip 39.

Twelve circumferentially spaced dogs 45 on the support ring 41 are radially aligned with the tabs 17, the tabs 17 and the dogs 45 being aligned with 12 parallel sided grooves 46 in the support ring 41. The forming tool 34 also has 12 parallel sided grooves 47 which are angularly displaced from the grooves 46 to enable the tool 34 to slide through the ring 41. The grooves 47 in the forming tool 34 define longitudinal ribs 48 each having an inclined end face 49 which aligns with one of the tabs 17.

In FIG. 3 the components are shown in their positions before the start of the assembly operation but with the top plate 32 and its associated components having moved slightly towards the bottom plate 25. As the top plate 32 continues its movement the annular lip 39 of the punch 35 and the support ring 41 contact the diaphragm spring 16. However the pre-load of the springs 36 is such that the annular punch 35 continues to move downwards with the top plate 32 so that the diaphragm spring 16 is deformed from the conical shape shown in FIG. 3 to a flat condition as shown in FIG. 4. Adjustable stops 51 on the bottom plate 25 contact buttons 52 on the annular punch 35 to stop the diaphragm spring 16 from being deflected beyond the flat condition. While the diaphragm spring 16 is being deflected the support ring 41 slides in the recess formed by the annular lip 39 against a relatively light load from springs 42.

As the top plate 32 continues to move downwards the springs 36 compress, the annular punch 35 being held by the stops 51. The support block 33 and the forming tool 34 move through the annular punch 35 and in doing so the inclined faces 49 on the forming tool 34 contact the tabs 17 so that each tab 17 is bent through approximately 55° over an adjacent arc of the fulcrum ring 21. During the bending of the tabs 17 the fulcrum ring 21 is supported against radially outward movement by abutment surfaces provided by the radially inner faces of the dogs 45 on the support ring 41, the dogs 45 giving the support to the ring 21 over those arcs of the ring which are gripped by the tabs 17. The tab itself, where it passes through the slot 18 in the diaphragm spring 16, is supported against radially inward movement during the bending by an abutment provided by the castellation 31 on the fixed support ring 29. As shown in FIG. 5, the diaphragm spring 16 is clenched quite firmly by the tabs 17 between the two fulcrum rings 21, 24, the tab 17 and the fulcrum ring 21 being located ready for the next stage of the assembly operation, although to avoid overstressing the tabs 17 a stop 53 is used to limit the stroke of the press by abutting the forming tool 34.

When the press is raised, the forming tool 34 and the support block 33 slide back through the annular punch 35 to their positions as shown in FIG. 4, but as the top plate 32 continues to move upwards the sub-assembly of the cover 11, the diaphragm spring 16 and the two fulcrum rings 21, 24 is carried up by the support ring 41 by virtue of the tabs 17 having been bent behind the dogs 45. Since the cover 11 is now free of the locating pins 26, the sub-assembly can be turned through approximately 15° so that the tabs 17 register with the recesses formed between the dogs 45, allowing the sub-assembly to be withdrawn from the apparatus.

Figure 6:
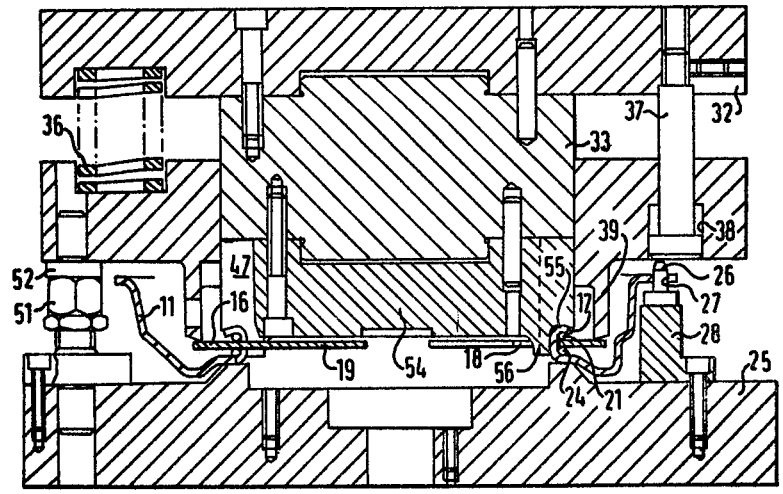
FIG. 6 is a cross-sectional view of apparatus similar to the apparatus shown in FIGS. 3 to 5 with those clutch components which are shown in FIGS. 3 to 5 having undergone a further stage in the assembly operation.

The apparatus shown in FIG. 6 is identical to that shown in FIGS. 3 to 5 except that a different forming tool 54 replaces both the forming tool 34 and the support ring 29, the other support ring 41 and the stop 53 being omitted. The forming tool 54 is similar to the tool 34 except that the end faces 55 which correspond to the end faces 49 on the forming tool 34 are each shaped to the final required form of the tab 17. The faces 55 merge with the outer faces of castellations 56 on the lower face of the forming tool 54 to support each tab 17 where it passes through the diaphragm spring 16. In operation the diaphragm spring 16 is flattened by the annular punch 35, the castellations 56 extend through the spring 16 to support the tabs 17 and the tabs are bent further over the adjacent arcs of the fulcrum ring 21 by the shaped faces 55 on the forming tool 54 to the positions shown in FIG. 6. This completes the sub-assembly of the cover 11, the diaphragm spring 16 and the two fulcrum rings 21, 24.

In a modification to the apparatus shown in FIGS. 3 to 5, the springs 42 and pegs 43 are omitted and the support ring 41 is a loose component which is placed in position on the diaphragm spring before the press is operated. The sequence of operation is as described above but, when the operation is completed and the top plate 32 rises, the ring 41 remains in position on the clutch sub-assembly which itself remains in position on the bottom plate 25. The ring 41 is then turned through approximately 15° to release it from the clutch sub-assembly, which is then ready for the operation described with reference to FIG. 6.

Figure 7:
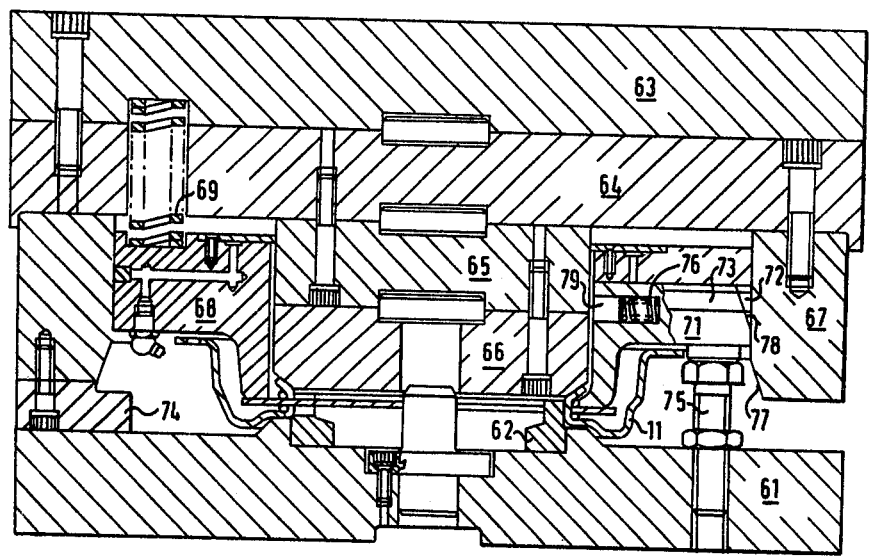
FIG. 7 is a cross-sectional view of another form of apparatus for assembling a sub-assembly of a diaphragm spring clutch according to the invention, showing those components of the clutch described with reference to FIGS. 1 and 2 which are shown in FIGS. 3 to 6 at the same stage of their assembly as is shown by FIG. 5.

In the alternative apparatus for performing the operations described with reference to FIGS. 3 to 5 which is shown in FIG. 7, the clutch cover 11 rests on a base plate 61 which carries a support ring 62 virtually identical to the support ring 29. The base plate 61 is adapted to be carried on the bottom bolster of a vertical press. A plate 63 is adapted to be carried by the top bolster of the press and this carries, through an intermediate plate 64 and a support plate 65, a forming tool 66 similar to forming tool 34.

A guide ring 67 carried by the intermediate plate 64 guides an annular punch 68 which is spring loaded in the downward direction by six circumferentially spaced springs 69. The annular punch 68 carries 12 abutment blocks 71 each of which is free to slide radially in a respective one of 12 circumferentially spaced recesses in the annular punch 68 and is guided by grooves 72 in the flanks of the recess and by corresponding tongues 73 in the abutment block 71.

In the position shown in FIG. 7 the press has moved to the limit of its downward movement as restricted by blocks 74 attached to the guide ring 67, tabs 17 having been deformed by the forming tool 66 in the manner described with reference to FIGS. 3 to 5. During the forming operation the support block 62 has prevented radially inward movement of the tabs 17 where it passes through the diaphragm spring and each abutment block 71 has supported against radially outward movement the adjacent arc of the fulcrum ring 21.

Operation of the apparatus shown in FIG. 7 can be understood from a description of the sequence of movement of the various parts of the apparatus as the top plate 63 is lifted by the press from the position shown in FIG. 7. In this position the abutment blocks 71 are supporting the fulcrum ring 21 by virtue of the opposite end face of each abutment block 71 abutting the bore of the guide ring 67. As the top plate 63 rises, it takes with it the intermediate plate 64, support plate 65, forming tool 66 and the guide ring 67, the annular punch 68 and the abutment blocks 71 remaining in their positions shown by virtue of the springs 69 keeping the annular punch 68 in contact with adjustable stops 75 which correspond to the adjustable stops 51 shown in FIGS. 3 to 5. Movement of the annular punch 68 relative to the guide ring 67 is limited by the blocks 74. However, before the blocks 74 reach the annular punch 68, each abutment block 71 slides radially outwards under the influence of a respective spring 76, cam means being provided by an inclined portion 78 on the end face of each abutment block 71 adjacent the guide ring 67 and a co-operating tapered bore portion 77 in the guide ring 67. Each spring 76 bears on the cylindrical surface of the support plate 65 and the forming tool 66 through a sliding plunger 79.

We claim:

1. A method of assembling a sub-assembly of a diaphragm spring friction clutch, the components of the sub-assembly comprising a cover, a diaphragm spring having a plurality of radially inwardly directed fingers and which is to be supported by the cover adjacent the radially outer ends of the fingers, the diaphragm spring being conically dished when in its relaxed state, a fulcrum ring which is to be located on the opposite side of the diaphragm spring to the cover, and a plurality of tabs which, before the assembly, extend from the cover in a direction substantially parallel to the axis of the spring, the method including the steps of assembling the diaphragm spring and said fulcrum ring, flattening the diaphram spring, thereby moving the peripheral rim of the spring relative to the cover against the load of the spring, and bending each tab radially outwards by a forming tool over the adjacent arc of the fulcrum ring to support the diaphragm spring on the cover while simultaneously supporting, against radially inward movement, each tab where it extends through the diaphragm spring and, against radially outward movement, each of said arcs of the fulcrum ring.

2. A method as claimed in claim 1 wherein the forming tool is urged axially with respect to the diaphragm spring.

3. A method as claimed in claim 2 wherein the tabs are bent simultaneously by a single forming tool.

4. A method as claimed in claim 3 wherein the spring is flattened by an annular punch having a spring loaded connection to the forming tool.

5. A method as claimed in claim 1 wherein the tabs are supported by abutments which are fixed relative to each other.

6. A method as claimed in claim 1 wherein the fulcrum ring is supported against radially outward movement by abutment surfaces provided on a support ring which includes recesses between adjacent pairs of abutment surfaces, the support ring being withdrawn past the tabs after the tabs have been bent by turning the support ring relative to the cover and bringing the recesses into register with the tabs.

7. A method as claimed in claim 1 wherein the fulcrum ring is supported by abutment surfaces provided on blocks which are moved into position by cam means operatively connected to the forming tool.

* * * * *